(12) United States Patent
Stahr

(10) Patent No.: US 9,249,894 B2
(45) Date of Patent: Feb. 2, 2016

(54) SOLENOID VALVE, BRAKING SYSTEM

(75) Inventor: Wolf Stahr, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 13/880,089

(22) PCT Filed: Aug. 30, 2011

(86) PCT No.: PCT/EP2011/064900
§ 371 (c)(1),
(2), (4) Date: Jul. 20, 2013

(87) PCT Pub. No.: WO2012/052212
PCT Pub. Date: Apr. 26, 2012

(65) Prior Publication Data
US 2013/0292590 A1 Nov. 7, 2013

(30) Foreign Application Priority Data

Oct. 20, 2010 (DE) .......................... 10 2010 042 676

(51) Int. Cl.
*F16K 31/00* (2006.01)
*F16K 31/06* (2006.01)
*B60T 8/36* (2006.01)

(52) U.S. Cl.
CPC .............. *F16K 31/0658* (2013.01); *B60T 8/363* (2013.01); *F16K 31/06* (2013.01)

(58) Field of Classification Search
CPC ...... F16K 31/06; F16K 31/0658; B60T 8/363
USPC .............................................. 251/64, 129.15
See application file for complete search history.

(56) References Cited

U.S. PATENT DOCUMENTS 3,446,473 A * 5/1969 Barker ........................... 251/64
5,056,556 A * 10/1991 Nishimoto et al. ........... 137/522
(Continued)

FOREIGN PATENT DOCUMENTS

DE 100 27 171 A1 8/2001
DE 103 11 486 A1 4/2004
(Continued)

OTHER PUBLICATIONS

International Search Report corresponding to PCT Application No. PCT/EP2011/064900, mailed Jan. 20, 2012 (German and English language document) (7 pages).

*Primary Examiner* — Marina Tietjen
*Assistant Examiner* — Umashankar Venkatesan
(74) *Attorney, Agent, or Firm* — Maginot, Moore & Beck LLP

(57) ABSTRACT

A solenoid valve, particularly for a hydraulic braking system of a motor vehicle, includes a valve sleeve in which a pole core is fixed and an armature is disposed in an axially displaceable manner. The armature includes at least one longitudinal groove in the outer shell surface thereof. A spring washer is configured to be braced between the armature and the pole core. The end face of the armature facing the pole core is configured to be at least substantially convex, and the end face of the pole core facing the armature is configured to be at least substantially concave. A braking system includes the solenoid valve.

11 Claims, 2 Drawing Sheets

(56) References Cited

U.S. PATENT DOCUMENTS

| | | | |
|---|---|---|---|
| 6,776,391 B1* | 8/2004 | Goossens et al. | 251/129.15 |
| 6,837,478 B1* | 1/2005 | Goossens et al. | 251/129.15 |
| 6,959,907 B2* | 11/2005 | Hironaka | 251/50 |
| 7,367,636 B2* | 5/2008 | Ho | 303/119.2 |
| 2005/0151104 A1* | 7/2005 | Goossens et al. | 251/129.19 |
| 2011/0204271 A1* | 8/2011 | Kratzer | 251/129.15 |
| 2011/0315907 A1* | 12/2011 | Ams et al. | 251/129.15 |
| 2012/0313022 A1* | 12/2012 | Godbillon | 251/129.15 |

FOREIGN PATENT DOCUMENTS

| | | |
|---|---|---|
| EP | 1 546 590 B1 | 6/2005 |
| JP | 3-1376 U | 1/1991 |
| JP | 2000-257742 A | 9/2000 |
| JP | 2003-514708 A | 4/2003 |
| JP | 2003-343754 A | 12/2003 |
| WO | 01/36243 A1 | 5/2001 |
| WO | 2004/033945 A1 | 4/2004 |

* cited by examiner

SOLENOID VALVE, BRAKING SYSTEM

This application is a 35 U.S.C. §371 National Stage Application of PCT/EP2011/064900, filed on Aug. 30, 2011, which claims the benefit of priority to Serial No. DE 10 2010 042 676.8, filed on Oct. 20, 2010 in Germany, the disclosures of which are incorporated herein by reference in their entirety.

BACKGROUND

The disclosure relates to a solenoid valve, particularly for an hydraulic braking system of a motor vehicle, having a valve sleeve, in which a pole core is fixed and an armature is arranged so that it is axially displaceable, wherein the armature comprises at least one longitudinal groove in the outer shell surface thereof, and wherein a disk spring is/can be braced between the armature and the pole core.

The disclosure further relates to a braking system, particularly for a motor vehicle, having at least one solenoid valve for controlling and/or regulating a pressure and/or a volumetric flow of a hydraulic medium of the braking system.

Solenoid valves and braking systems of the aforementioned type are known from the state of the art. Solenoid valves, which are designed as normally closed solenoid valves, are used, in particular, for safety-relevant brake applications, such as, for example, ABS or ESP systems (ABS=antilock braking system; ESP=electronic stability program). Such valves are capable of assuming at least two different hydraulic settings, for example open or closed, or they are also further adjustable through partial lifting between open and closed as so-called control valves. The closed position of the solenoid valve in the non-energized, i.e. unactuated state is usually ensured by way of a compression spring. A magnetic or electromagnetic actuator, which comprises an electromagnetic coil and magnetically active components in the solenoid valve, serves for switching or actuation of the solenoid valve. The components provided here in the valve are a pole core and an axially displaceable armature. On actuation, a pole core enclosed by the electromagnetic coil exerts a tensile force on the armature, in order to displace the latter axially, thereby exposing a valve opening. Such solenoid valves usually have a magnetic force characteristic such that the magnetic force increases very sharply (exponentially) as the working air gap diminishes, that is to say as the distance between the armature and the pole core diminishes. A known way of optimizing the magnetic force characteristic is to arrange a disk spring, which acts in parallel with the compression spring and which may be magnetizable, between the pole core and the armature. As the working air gap diminishes here, a radially running secondary flow occurs, the radial component of which no longer contributes to the axial force and allows only a shallow rise in the latter—despite the diminishing working air gap. It is thereby possible to exert a beneficial influence on the magnetic force, so that it approximates to the ideal state.

Providing the armature with at least one longitudinal groove, which serves to equalize the hydraulic pressure between the working air gap and the pressure chamber at the valve tip assigned to the armature, is also known. In hitherto known solenoid valves, however, the longitudinal groove means that at its outer circumference the spring disk does not bear fully on the end face of the armature facing the pole core. Particularly in the case of a disk spring having one or more radial recesses, the spring characteristic would depend overall on the rotational position of the disk spring relative to the armature. Furthermore, the longitudinal groove reduces the fatigue strength of the disk spring, since the material stress increases significantly due to the deformation introduced via the longitudinal groove.

SUMMARY

A distinctive feature of the solenoid valve according to the disclosure is that the end face of the armature facing the pole core is of at least substantially convex design and the end face of the pole core facing the armature is of at least substantially concave design. This serves to ensure that at its outer circumference the disk spring bears against the pole core and centrally against the armature. The longitudinal groove formed in the armature thereby does not exert any effect on the working of the disk spring. The pole core is, as usual, enclosed over its full circumference by the valve sleeve and also does not have any longitudinal grooves, since the pole core preferably tightly seals off the valve sleeve axially. The convex design of the end face of the armature and the concave design of the end face of the pole core allow the armature, when it is magnetically attracted by the pole core, to penetrate into the pole core in certain areas, the spring arranged between them being braced between the pole core and the armature. Centrally, the end face of the armature preferably has a plane bearing surface for the disk spring, the diameter of the bearing surface having a further influence on the spring characteristic of the disk spring.

The disk spring is preferably of annular design, so that it has an outside diameter and an inside diameter. The outside diameter preferably corresponds at least substantially to the outside diameter of the pole core and/or of the armature. The inside diameter is preferably selected according to the desired spring force of the disk spring.

The disk spring more preferably comprises at least one radial recess on its outer circumference. The recess serves to optimize the spring characteristic of the disk spring for the respective application. The disk spring is more preferably made from a magnetizable material.

The disk spring preferably comprises a plurality of radial recesses distributed, in particular uniformly, over its outer circumference. The radial recesses are more preferably designed and arranged in such a way that the disk spring, at its outer circumference, is of star-shaped design with narrowly tapering spring tongues. Since the disk spring, at its outer circumference, bears on the pole core, all spring tongues of the disk spring are in contact with the pole core and exert a corresponding spring force, irrespective of the rotational position of the disk spring. The advantageous solenoid valve is therefore a simple way of ensuring a desired spring characteristic of the disk spring at all times.

According to an advantageous development of the disclosure the end face of the pole core comprises at least one axial projection as an axial stop for the armature. In order to define the minimum working air gap between the pole core and the armature, and/or to determine a maximum deformation of the disk spring, the pole core is provided with the axial projection on its end face. When the solenoid valve is actuated, the armature encounters the axial projection, which serves as axial stop.

The axial projection is preferably arranged centrally. Particularly if the disk spring is of annular design, the axial projection is arranged centrally in such a way that it reaches through the recess in the disk spring, and so that the annular disk spring is deformed past the axial projection.

For this purpose the axial projection preferably has an outside diameter which is smaller than the inside diameter of the annular disk spring. The axial projection is preferably of a truncated cone shape, so that the inclined outer shell surface thereof serves or can serve as guide for the disk spring.

According to a development of the disclosure the armature, in the end face facing the pole core, comprises an opening, through which in certain areas a thrust piece, supported in the armature, is displaceable or through which it reaches. The thrust piece is preferably subjected to a pre-stressing force, which is generated by a compression spring arranged in the armature, so that the thrust piece is pushed in the direction of the opening. Here an axial stop of the armature and an axial stop of the thrust piece each prevent the thrust piece being pushed out of the armature. The thrust piece is designed in such a way that the free end thereof projects through the opening in the armature and bears against the end face of the pole core. The compression spring in the armature therefore generates a pre-stressing force, which pushes the armature away from the pole core in the direction of the valve seat provided on the opposite side, in order to close the valve in the non-energized state.

The diameter of the opening is preferably smaller than the outside diameter of the axial projection of the pole core. This ensures that in the actuated or energized state of the solenoid valve the axial projection of the pole core or the axial stop of the pole core bears on the end face of the armature. In particular, the diameters are suitably selected in such a way as to prevent the axial projection from penetrating into the opening and any tilting or jamming of the solenoid valve possibly resulting from this.

A distinctive feature of the braking system according to the disclosure is the design of the solenoid valve, as has been described above. The braking system is preferably embodied as an ABS or ESP system of a motor vehicle. The advantageous design of the solenoid valve affords a solenoid valve permanently endowed with the desired spring characteristic, which is easy to produce and to assemble, making the braking system reliable and cost-effective.

BRIEF DESCRIPTION OF THE DRAWINGS

The disclosure will be explained in more detail below with reference to the drawing, in which.

DETAILED DESCRIPTION

Figure 1:
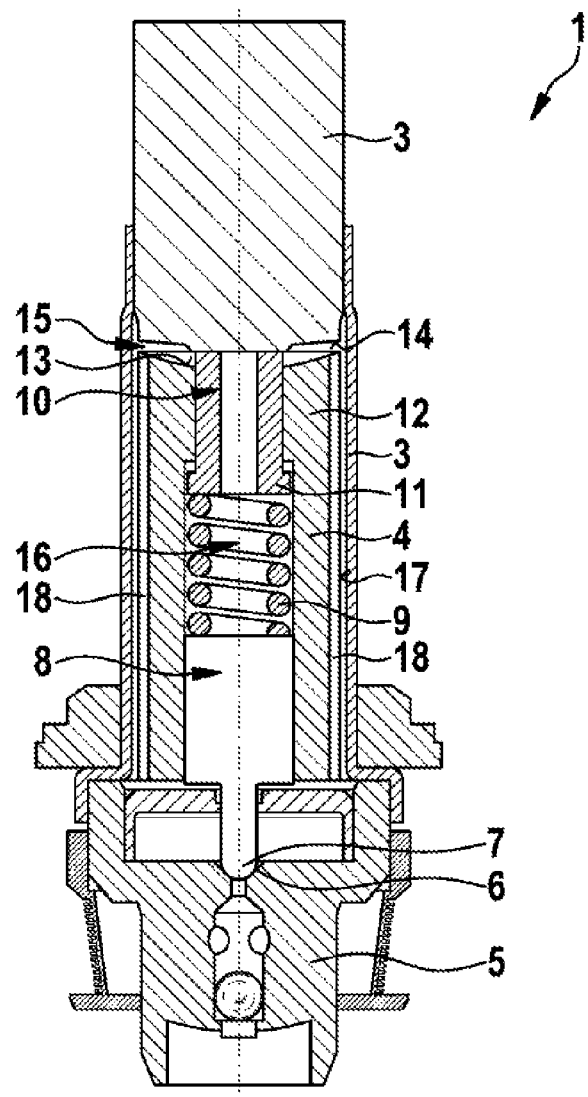
FIG. 1 shows a representation in longitudinal section of a normally closed solenoid valve in the state of the art.

FIG. 1 shows a simplified representation in longitudinal section of a normally closed solenoid valve 1 in the state of the art. The solenoid valve 1 comprises a valve sleeve 2, in which a pole core 3 is fixed and an armature 4 is arranged so that it is axially displaceable. The pole core 3 here closes one end of the valve sleeve 2. A valve body 5, which comprises a valve seat 6, into which a valve tip 7 is pushed, is arranged on the opposite side to the pole core 3. The valve tip 7 is integrally formed with a pin 8, which is pressed in in an axial recess 9 of the armature 4. The axial recess 9 extends through the entire armature 4 a thrust piece 10 being arranged at the opposite end to the pin 8. Viewed in cross section, the thrust piece 10 has a T-shape, the cross member forming an axial stop 11 arranged in the armature 4 and the longitudinal member extending through a tapered portion 12 of the axial recess 9 beyond the end face 13 of the armature 4 facing the pole core 3. The thrust piece 10 bears on the end face 14 of the pole core 3 facing the armature 4 and therefore bridges the so-called working air gap 15 between the pole core 3 and the armature 4. Here the end face 14 of the pole core 3 is of convex design and the end face 13 of the armature 4 is of concave design.

A compression spring 16 in the form of a helical spring, which pushes the thrust piece towards the pole core 3 and thereby pushes the armature 4 with the valve tip 7 into the valve seat 6, is braced between the thrust piece 10 and the pin 8.

In its outer shell surface 17 the armature 4 comprises two opposing longitudinal grooves 18 extending over the entire length of the armature 4. The longitudinal grooves 18 produce a fluid-tight connection between the working air gap 15 and a pressure chamber in the valve body 5 that can be closed by the valve tip 7, in order to ensure an equalization of pressure between these.

If a disk spring, not represented in FIG. 1 is arranged between the armature 4 and the pole core 3 for influencing and optimizing the spring force characteristic of the solenoid valve 1, the longitudinal grooves 18 mean that the disk spring is not uniformly stressed and/or does not bear on the end face 13 of the armature 4 over the full circumference.

Figure 2:
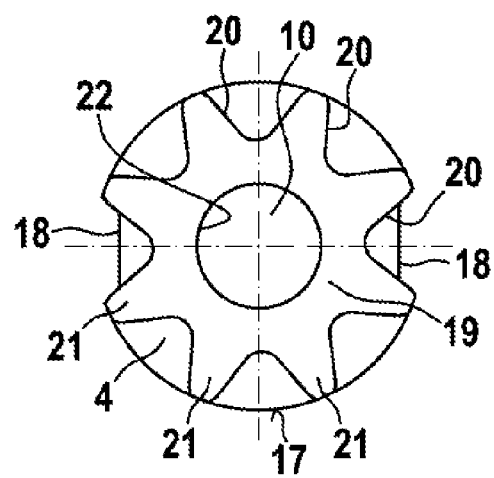
FIG. 2 shows an advantageous embodiment of a disk spring of the solenoid valve.

The longitudinal grooves 18 may prevent the disk spring from bearing on the armature 4 in certain areas, particularly if the disk spring, as represented in a top view of the armature 4 in FIG. 2, is embodied as an annular disk spring 19, which at its outer circumference comprises multiple radial recesses 20 (only some of which are provided with reference numerals here) distributed or formed over the circumference. Here, depending on the rotational position of the disk spring 19, the radial tongues 21 remaining between the radial recesses 20 may lie in the area of the longitudinal grooves 18 and thereby not contribute to the spring force, or may have a negative influence on the spring characteristic actually expected.

Figure 3:
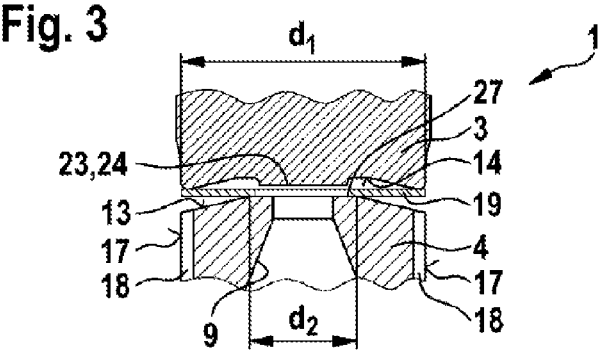
FIG. 3 shows an enlarged representation in longitudinal section of an advantageous embodiment of the solenoid valve.

The solenoid valve 1 is therefore preferably designed in such a way that the end face 13 of the armature 4 facing the pole core 3 is of convex design and the end face 14 of the pole core 3 facing the armature 4 is of concave design, as shown in an enlarged representation in longitudinal section of the solenoid valve 1 in FIG. 3. FIG. 3 here shows only the pole core 3, the armature 4 and the disk spring 19 arranged between them. It can clearly be seen in FIG. 3 that owing to the advantageous design of the solenoid valve 1 the disk spring 19 bears at its outer circumference on the pole core 3 and centrally on the armature 4, so that irrespective of the rotational position of the disk spring 19 the longitudinal grooves 18 of the armature 4 cannot influence the spring stiffness of the disk spring 19. As shown in FIG. 2, the annular disk spring 19 has a central opening 22. The inside diameter thereof is suitably chosen so that it is larger than the outside diameter of the thrust piece 10 projecting over the end face 13, so that said thrust piece can pass through the disk spring 19 into bearing contact with the pole core 3.

Figure 4A:
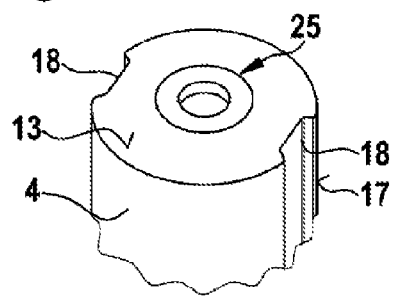
FIGS. 4A and 4B show bearing contacts of the disk spring and FIGS. 5A and 5B show the advantageous solenoid valve in different operating states.
Figure 4B:
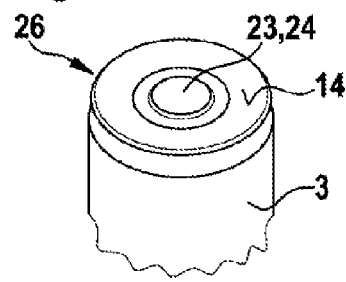

FIGS. 4A and 4B show a perspective representation of the armature 4 (FIG. 4A) and of the pole core 3 (FIG. 4B), the line contact 25 or 26 formed between the disk spring 19 and the armature 4 or the pole core respectively being drawn in according to the advantageous embodiment of the solenoid valve 1 featured here.

As shown in FIG. 3, the pole core 3 further comprises an axial projection 23 on its end face 14. The axial projection 23 is arranged or aligned centrally or coaxially and forms an axial stop 24 for the armature 4. Centrally the end face 13 of the armature 4 comprises a plane bearing surface 27 departing from the convex shape, which defines the maximum bearing area of the disk spring 19 against the armature 4. Here the chosen inside diameter of the opening 22 of the disk spring 19 is larger than the outside diameter of the axial projection 23, so that when the armature 4 is drawn against the pole core 3 the axial projection 23 penetrates through the disk spring 19, and the armature 4 with its end face 13 strikes against the axial stop 24, as represented in FIG. 5B.

Figure 5A:
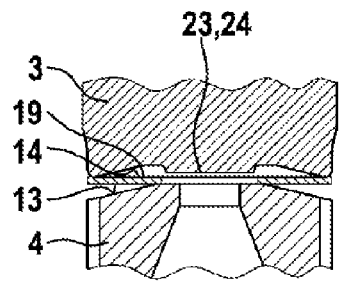
Figure 5B:
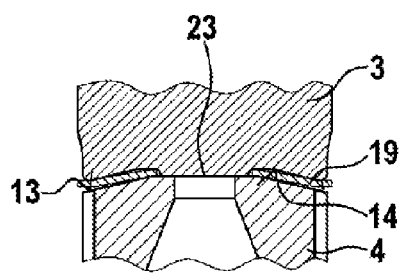

FIGS. 5A and 5B show the detail in FIG. 3A in different operating positions. According to FIG. 5A the solenoid valve 1 is on its normally closed state, whilst FIG. 5B shows the solenoid valve 1 in the actuated, that is to say energized state, in which the armature 4 is displaced in the direction of the pole core 3, so that the armature 4 bears with its end face 13 on the axial projection 23 of the pole core 3.

The advantageous geometry of the pole core 3, of the armature 4 and of the disk spring 19 ensures a line contact 25, 26 in the form of a circle at all times, as represented in FIGS. 4A and 4B. This allows the use of disk springs 19 having radial recesses, as are represented in FIG. 2, since the spring characteristic is retained irrespective of the rotational position of the disk spring. The fatigue strength of the disk springs used moreover increases due to the continuous bearing surface or the continuous line contact, the line contact in the case of the disk spring 19 with radial recesses 20 obviously not being continuous but being regularly (as seen in the circumferential direction) and reliably present, irrespective of the rotational position of the disk spring 19. The spring characteristic can be adjusted via the diameter d1 of the pole core 3 and the diameter d2 of the bearing surface 27 of the armature 4. Varying these dimensions serves to vary the lever arm and therefore the spring characteristic curve of the disk spring 19. The axial stop 24 for the armature 4 allows a precise adjustment and checking of the pre-stressing force of the compression spring 16 and the disk spring 19, especially when assembling the solenoid valve 1.

The invention claimed is:

1. A solenoid valve, comprising:
   a valve sleeve;
   a pole core fixed in the valve sleeve;
   an armature arranged so that it is axially displaceable in the valve sleeve, the armature including at least one longitudinal groove in an outer shell surface thereof, and
   a disk spring configured to be braced between the armature and the pole core,
   wherein an end face of the armature facing the pole core is of at least substantially convex design and an end face of the pole core facing the armature is of at least substantially concave design,
   wherein the end face of the pole core comprises at least one axial projection as an axial stop for the armature,
   wherein the end face of the armature defines an opening, and
   wherein the inside diameter of the opening in the end face of the armature is smaller than the outside diameter of the axial projection,
   wherein the axial projection makes contacts with the end face of the armature.
2. The solenoid valve as claimed in claim 1, wherein the disk spring is of annular design.
3. The solenoid valve as claimed in claim 1, wherein the disk spring comprises at least one radial recess on its outer circumference.
4. The solenoid valve as claimed in claim 1, wherein the disk spring comprises a plurality of recesses distributed over its outer circumference.
5. The solenoid valve as claimed in claim 1, wherein the axial projection is arranged centrally.
6. The solenoid valve as claimed in claim 1, wherein the axial projection has an outside diameter which is smaller than the inside diameter of a central opening of the annular disk spring.
7. The solenoid valve as claimed in claim 1, wherein the armatures includes a thrust piece that is displaceably received in the armature, the thrust piece extending through an opening defined in the end face of the armature.
8. A braking system, comprising:
   at least one solenoid valve configured to one or more of control and regulate one or more of a pressure and a volumetric flow of an hydraulic medium of the braking system, the solenoid valve including:
   a valve sleeve;
   a pole core fixed in the valve sleeve;
   an armature arranged so that it is axially displaceable in the valve sleeve, the armature including at least one longitudinal groove in an outer shell surface thereof, and
   a disk spring configured to be braced between the armature and the pole core,
   wherein an end face of the armature facing the pole core is of at least substantially convex design and an end face of the pole core facing the armature is of at least substantially concave design,
   wherein the end face of the pole core comprises at least one axial projection as an axial stop for the armature,
   wherein the end face of the armature defines an opening,
   wherein the inside diameter of the opening in the end face of the armature is smaller than the outside diameter of the axial projection, and
   wherein the axial projection makes contacts with the end face of the armature.
9. The solenoid valve as claimed in claim 1, wherein the solenoid valve is for a hydraulic braking system of a motor vehicle.
10. The solenoid valve as claimed in claim 4, wherein the plurality of recesses is distributed uniformly over the outer circumference of the disk spring.
11. The braking system as claimed in claim 8, wherein the braking system is for a motor vehicle.

* * * * *